United States Patent
Botma et al.

[11] Patent Number: 5,819,637
[45] Date of Patent: Oct. 13, 1998

[54] TOASTER HAVING HEATING ELEMENTS WHOSE HEATING AREA DEPENDS ON THE SLICE SIZE

[75] Inventors: Jacob H. Botma; Roelf Van Der Wal; Klaas J. Lulofs, all of Drachten, Netherlands

[73] Assignee: U.S. Philips Corporation, New York, N.Y.

[21] Appl. No.: 834,069

[22] Filed: Apr. 14, 1997

[30] Foreign Application Priority Data

Apr. 29, 1996 [EP] European Pat. Off. ............ 96201174

[51] Int. Cl.⁶ .................. A47J 37/08; H05B 1/02
[52] U.S. Cl. ................ 99/327; 99/331; 99/385; 99/389; 219/492; 219/521
[58] Field of Search ............. 99/385, 389, 391, 99/393, 400, 401, 326–333; 219/543, 544, 411, 413, 492, 494, 521, 497

[56] References Cited

U.S. PATENT DOCUMENTS

| | | | |
|---|---|---|---|
| 4,491,066 | 1/1985 | Juriga et al. | 99/391 |
| 4,791,862 | 12/1988 | Hoffmann | 99/385 |
| 5,181,455 | 1/1993 | Masel et al. | 219/521 X |
| 5,390,588 | 2/1995 | Krasznai et al. | 99/389 |
| 5,692,432 | 12/1997 | Hazan et al. | 99/328 |

*Primary Examiner*—Timothy F. Simone
*Attorney, Agent, or Firm*—Robert J. Kraus

[57] ABSTRACT

A Toaster having heating elements whose heating area depends on the slice size. A toaster has heating elements (H1, H2) divided into sub-elements (H1A, H1B; H2A, H2B) which can be activated individually. The size of the product to be toasted (5) is detected by means of a sensor, for example a mechanical sensor (2) or an optical sensor device with a photo-emitter and a photo-receiver. The sub-elements are activated selectively in dependence on the detected size. Thus, the power consumption of the toaster is adapted to the size of the product to be toasted and overheating of the product in the proximity of the unused heating area of the heating elements is avoided.

11 Claims, 5 Drawing Sheets

TOASTER HAVING HEATING ELEMENTS WHOSE HEATING AREA DEPENDS ON THE SLICE SIZE

BACKGROUND OF THE INVENTION

The invention relates to a toaster comprising: a toasting chamber for receiving a product to be toasted and at least one heating element arranged in the toasting chamber for heating the product.

Toasters of this type are generally known. The bread to be toasted is inserted into the toasting chamber and is exposed to heating by the heating element. The number of heating elements depends on the type of toaster. There are types having a centrally mounted heating element, enabling one slice of bread to be placed on either side of the heating element. In this type the slice of bread should be turned in order to allow both sides of the slice to be toasted. There are also types having two heating elements, the slice being interposed between the heating elements and both sides being toasted at the same time. There is a trend towards and a demand for toasters having a larger toasting chamber in order to enable as many as possible different types of bread of just as many different sizes to be toasted. A larger toasting chamber requires larger heating elements with higher power ratings so as to maintain the power density over the increased area. A disadvantage is that such a toaster consumes more current than usually necessary and that the edges of comparatively small pieces of bread are heated more intensively by the surplus heating area of the heating element and become too dark or even charred.

SUMMARY OF THE INVENTION

It is an object of the invention to provide a toaster which is more suited for toasting bread of varying sizes. To this end, according to the invention, the toaster of the type defined in the opening paragraph is characterized in that the at least one heating element is divided into individual sub-elements which can be activated separately, and the toaster further comprises: detection means for determining a dimension of the product and means for selectively activating the individual sub-elements in dependence on the dimension of the product.

The detection means measure the size of the bread to be toasted and only those sub-elements which face the piece of bread are activated, i.e. turned on, in order to toast the piece of bread. The other sub-elements are not activated, thus precluding overheating of the edges of the bread and unnecessary power consumption.

The heating element can be divided into a multitude of sub-elements, for example arranged in a matrix. Such an arrangement requires intricate detection means and an intricate drive of the sub-elements. A simplified arrangement is obtained with an embodiment of the toaster in accordance with the invention which is characterized in that the sub-elements are constructed as a plurality of parallel strips which face the product to be toasted.

The division into strips enables the heating area to be adapted in one dimension to the corresponding dimension of the bread to be toasted. Since the bread and the heating elements in most toasters are disposed vertically and the bread is generally supported at a low level in the toasting chamber, it is advantageous to choose a division in horizontal strips so as to allow adaptation to the varying slice height.

In the type having two heating elements, where the slice of bread is placed between the heating elements, the ease of use can be improved with an embodiment of the toaster in accordance with the invention, which is characterized in that the toaster comprises two heating elements divided into sub-elements, which heating elements are arranged in the toasting chamber at either side of the product to be heated, and means for selectively activating one of the two heating elements separately or the two heating elements at the same time.

This enables one of the two heating elements to be turned off completely, so that it is also possible to toast bread having a crust at one side, such as French bread cut lengthwise.

The number of individual sub-elements per heating element is optional. A simple embodiment is characterized in that the heating element is divided into two sub-elements which are electrically connected to one another as a series arrangement, one of the two sub-elements being connectable to a supply voltage via a first electronic switch and the series arrangement being connectable to the supply voltage via a second electronic switch.

In this way each of the heating elements can be divided into a lower heating sub-element and an upper heating sub-element, the detection means determining the height of the slice and the upper heating sub-element being turned on only if the height exceeds a given value.

Thus, as a result of the possibility of turning off one of the heating elements for one-side toasting and as a result of the division of each heating element into two sub-elements, there are four sub-elements in total, each requiring an individual supply with mains current. If the dimensions and, consequently, also the power of the upper heating sub-element is smaller than that of the lower heating sub-element, it becomes difficult to make the resistance of the smaller sub-element high enough to assure a long life. This problem is precluded by series arrangement of the two sub-elements. For small-size bread only the lower heating sub-element is supplied with mains voltage via the first electronic switch and for large-size bread the series arrangement of the two sub-elements is supplied with mains voltage via the second electronic switch.

In the case of series arrangement the resistance of the heating element increases and the power decreases. In order to cope with the loss of power in the case of series arrangement, an embodiment is characterized in that an average conduction time of the first electronic switch in the case of connection via the first electronic switch is smaller than the average conduction time of the second electronic switch in the case of connection via the second electronic switch. By reducing the average on-time of the first electronic switch it is achieved that the one sub-element always delivers the same power.

With respect to the detection means an embodiment of the toaster is characterized in that the detection means comprise: a sensor arranged in the toasting chamber for detecting the presence of the product to be toasted in the toasting chamber. Depending on the division into sub-elements one or more sensors are needed in order to detect which sub-elements should be activated. Sensors which are suitable for this purpose can be constructed as a mechanical sensor or as an optical sensor with a photo-emitter and a photo-receiver, but in principle other sensors are also possible. The piece of bread comes into contact with the mechanical sensor or interrupts the light beam of the optical sensor upon introduction into the toasting chamber.

In the case of toasters of the type in which the slice of bread is positioned between the heating elements, the bread is generally brought into the toasting chamber by means of a lift. This lift can be operated by hand but there are also motor-driven versions. In order to determine the size of the bread an embodiment of the toaster in accordance with the invention is characterized in that the toaster further comprises: a motor lift for introducing the product into the toasting chamber, time measurement means for measuring an activation time of the sensor during the movement of the product past the sensor, and calculating means for calculating the dimension of the product in response to the activation time and a transport speed of the motor lift.

As the lift descends into the toasting chamber the piece of bread moves past the sensor. The time of passage is measured and the size of the piece of bread is calculated on the bases of the transport speed of the lift. Thus, the presence of the motor lift can be used advantageously for accurately determining the size of the piece of bread.

Since the transport speed may be subject to spread, the calculated size is also subject to spread. In order to allow for this, a further embodiment of the toaster in accordance with the invention is characterized in that the motor lift is adapted to move the product to an end position situated at a predetermined distance from the sensor, and the toaster further comprises: further time measurement means for measuring the transport time expiring between the instant at which the activation of the sensor begins during the movement of the product past the sensor and the instant at which the end position is reached, and further calculating means for calculating the transport speed in response to the transport time and the predetermined distance. By always moving the bread to a fixed end position relative to the sensor it is possible to calculate the transport speed by measuring the time necessary to move the bread over the known distance between the sensor and the end position. The exact value of the transport speed then no longer plays a part in the calculation of the size of the bread.

For an even more convenient operation of the toaster an embodiment of the toaster is characterized in that the toaster further comprises means for activating the motor lift in response to a signal from the sensor. The sensor is activated when a slice of bread is inserted in the lift, as a result of which the motor lift is put into operation automatically.

BRIEF DESCRIPTION OF THE INVENTION

These and other aspects of the invention will be described and elucidated with reference to the accompanying drawing figures, in which.

In these Figures like parts bear the same reference symbols.

DESCRIPTION OF THE PREFERRED EMBODIMENTS

Figure 1:
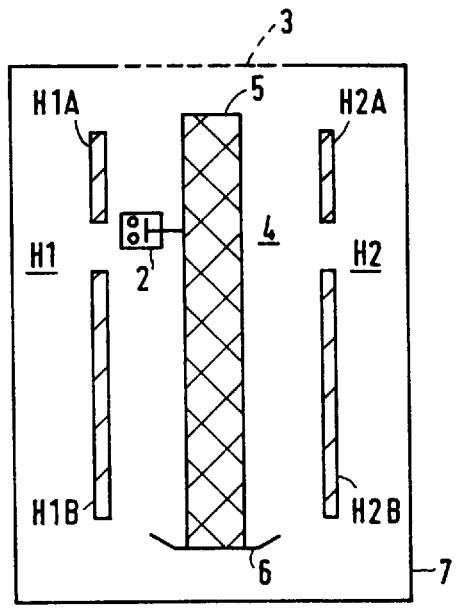
FIG. 1 is a cross-sectional view of an embodiment of a toaster in accordance with the invention.

FIG. 1 is a cross-sectional view showing an embodiment of a toaster in accordance with the invention. The toaster comprises a casing 7 which encloses a toasting chamber 4, in which two heating elements H1 and H2 are disposed at either side of one or more slices of bread 5, which can be brought into the toasting chamber 4 by means of a lift 6 via a slot 3 in the casing 7. Each of the heating elements H1 and H2 is divided into, for example, two individual sub-elements. The heating element H1 is divided into an upper sub-element H1A for heating the upper part and a lower sub-element H1B for heating the lower part. Likewise, the heating element H2 at the other side of the slice of bread 5 is divided into an upper sub-element H2A and a lower sub-element H2B. The heating area of the upper sub-elements H2A and H2A is smaller than that of the lower sub-elements H1B and H2B, but this is not necessary. Each of the heating elements H1 and H2 can also be divided into 3 or more sub-elements. The radiant surfaces of the sub-elements H1A, H1B, H2A and H2B form strips arranged above one another, which strips extend horizontally in the longitudinal direction of the toaster and face the slice of bread 5. As a result of the division into sub-elements the heating area of the heating elements H1 and H2 can be adapted to the dimensions and the position of the product to be toasted. If the height of the slice of bread 5 is greater than the height of the lower sub-elements H1B and H2B, the upper sub-elements H1A and H2A also turned on for toasting. If the height of the slice of slice of bread 5 is smaller than the height of the lower sub-elements H1B and H2B, only the lower sub-elements H1B and H2B are turned on. This is in order to prevent the toaster from consuming more current than normally necessary and the edges of comparatively small pieces of bread from being heated more intensively by the surplus heating area of the heating element and become too dark or even charred. The size of the product to be toasted can be determined by means of one or more mechanical sensors 2 arranged at suitable locations within the toasting chamber 4.

Figure 2:
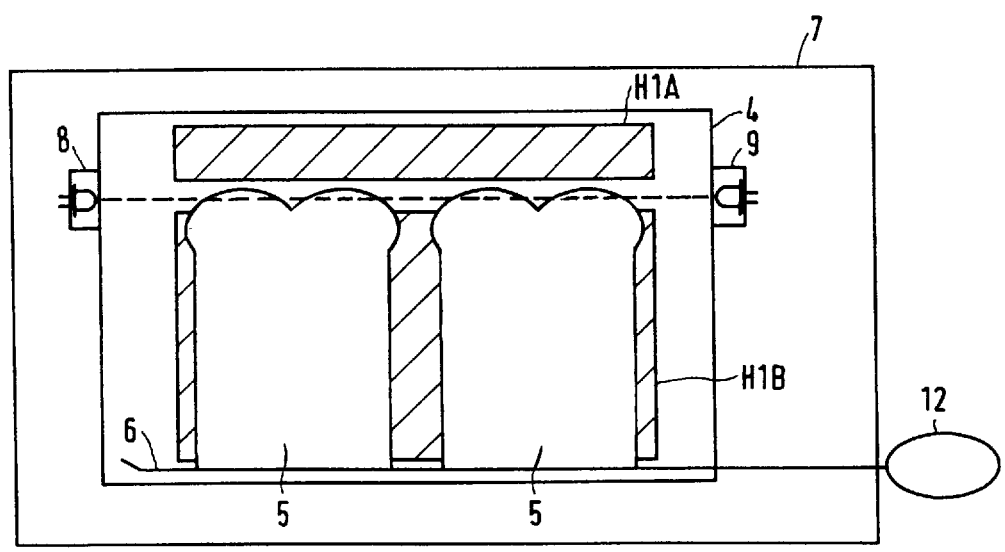
FIG. 2 is a longitudinal sectional view of an embodiment of a toaster in accordance with the invention.

FIG. 2 is a longitudinal section view showing the toaster having an optical sensor device for determining the size of the product to be toasted. The optical sensor device comprises an infrared (IR) photo-emitter 8 and an IR photo-receiver 9, arranged at a suitable height in the toasting chamber 4. The photo-emitter 8 emits an IR light beam to the IR photo-receiver 9 in the longitudinal direction of the toasting chamber 4 between the heating elements, so that for determining the size it is irrelevant how broad the slice of bread 5 is or where the slice is situated on the lift 6. The product 5 to be toasted, shown as two slices of bread 5 in FIG. 2, is placed on the lift 6 and is conveyed into the toasting chamber 4 by means of a handle 12. The product then interrupts the light beam from the IR photo-emitter 8. If the light beam is still interrupted by the product when the end position of the lift 6 is reached, the upper sub-elements H1A and H2A are also activated during toasting; if the light beam is no longer interrupted only the sub-elements H1B and H2B are activated.

The division of each heating element into two sub-elements shown in FIG. 1 has only been chosen by way of example. A division into 3 or more horizontal strips, into vertical strips, or into a matrix of rectangular, square or differently shaped sub-elements is also possible. However, the number of sensors for determining which of the individual sub-elements should be activated during toasting increases with the number of sub-elements. The electric circuit for processing the sensor signals and driving the individual sub-elements is also more complex as a larger number of sub-elements is used.

A measurement of the exact height of the slice 5 is not possible by means of either the optical sensor device shown in FIG. 2 or the mechanical sensor 2 shown in FIG. 1. This would require a very large number of sensors. However, by providing the toaster with a motor lift, it is possible to effect an accurate measurement of the size of the product to be toasted by means of only one mechanical sensor or optical sensor device. FIG. 3 again shows a longitudinal sectional view of the toaster. The optical sensor device with the IR photo-emitter 8 and the IR photo-receiver 9 has been transferred to the upper part of the toasting chamber 4, as a result of which the light beam is interrupted upon entry in the toasting chamber 4. The lift 6 is driven by an electric motor 10 via a toothed rack 11. By measuring the activation time during which the light beam is interrupted by the slice of bread 5 it is possible to calculate the height of the slice of bread on the basis of the measured activation time and the transport speed of the lift 6. Since the transport speed may vary the calculated dimension is not always accurate. This inaccuracy can be eliminated by also measuring the time which expires between the instant at which the interruption of the light beam begins and the instant at which the end position of the lift 6 is reached. The end position is detected, for example, by means of a contact 14 which is activated when the lift 6 has descended wholly into the toasting chamber 4. The distance PD between the light beam and the end position of the lift 6 is a predetermined fixed distance. Thus, the transport time which expires to cover the distance PD is a measure of the transport speed. The height of the slice of bread can be calculated even more accurately from the ratio between the activation time and the transport time.

Figure 4:
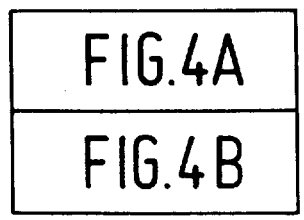
FIG. 4 is a diagram of an electric circuit for use in an embodiment of a toaster in accordance with the invention.
Figure 4A:
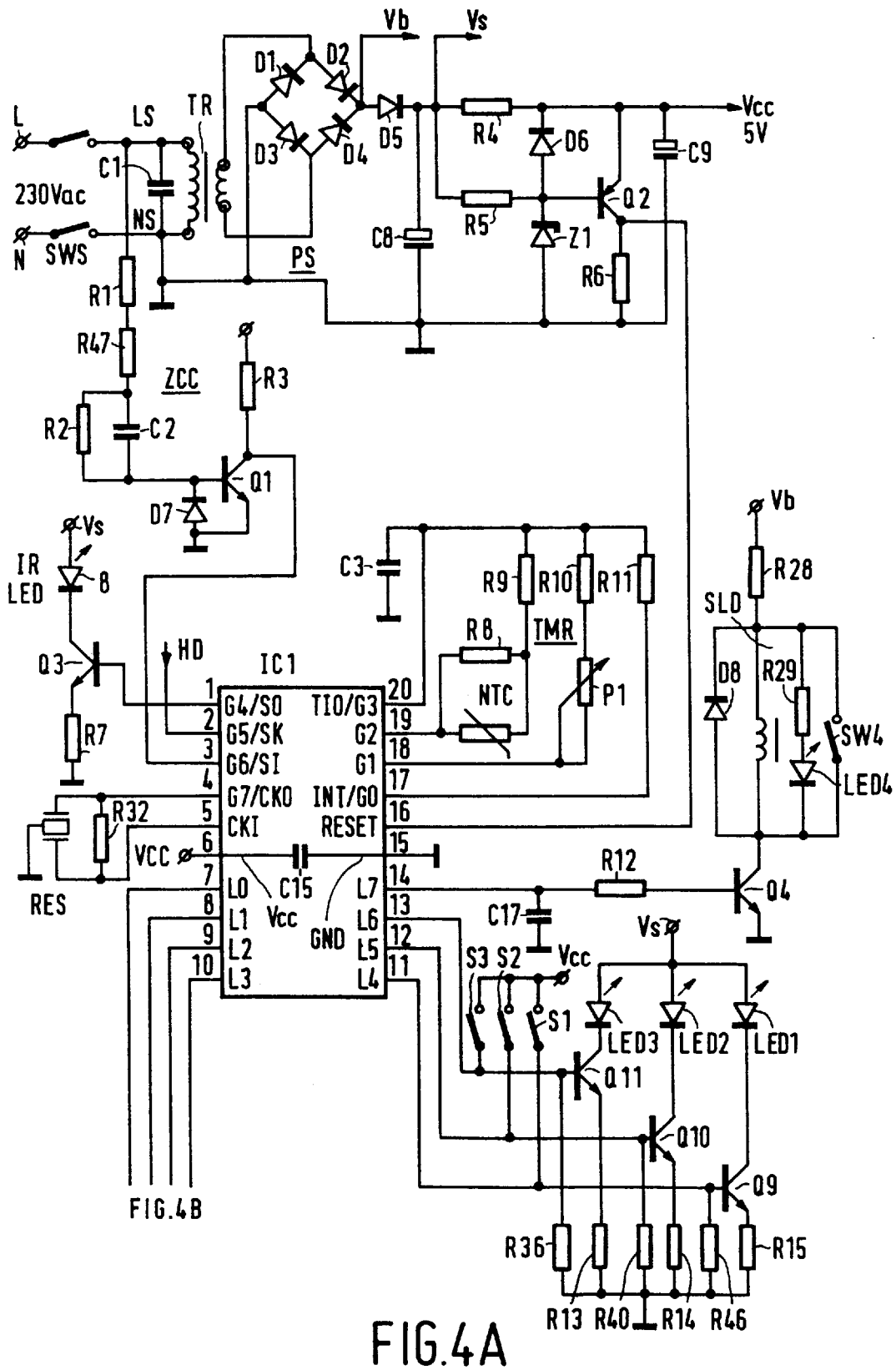
Figure 4B:
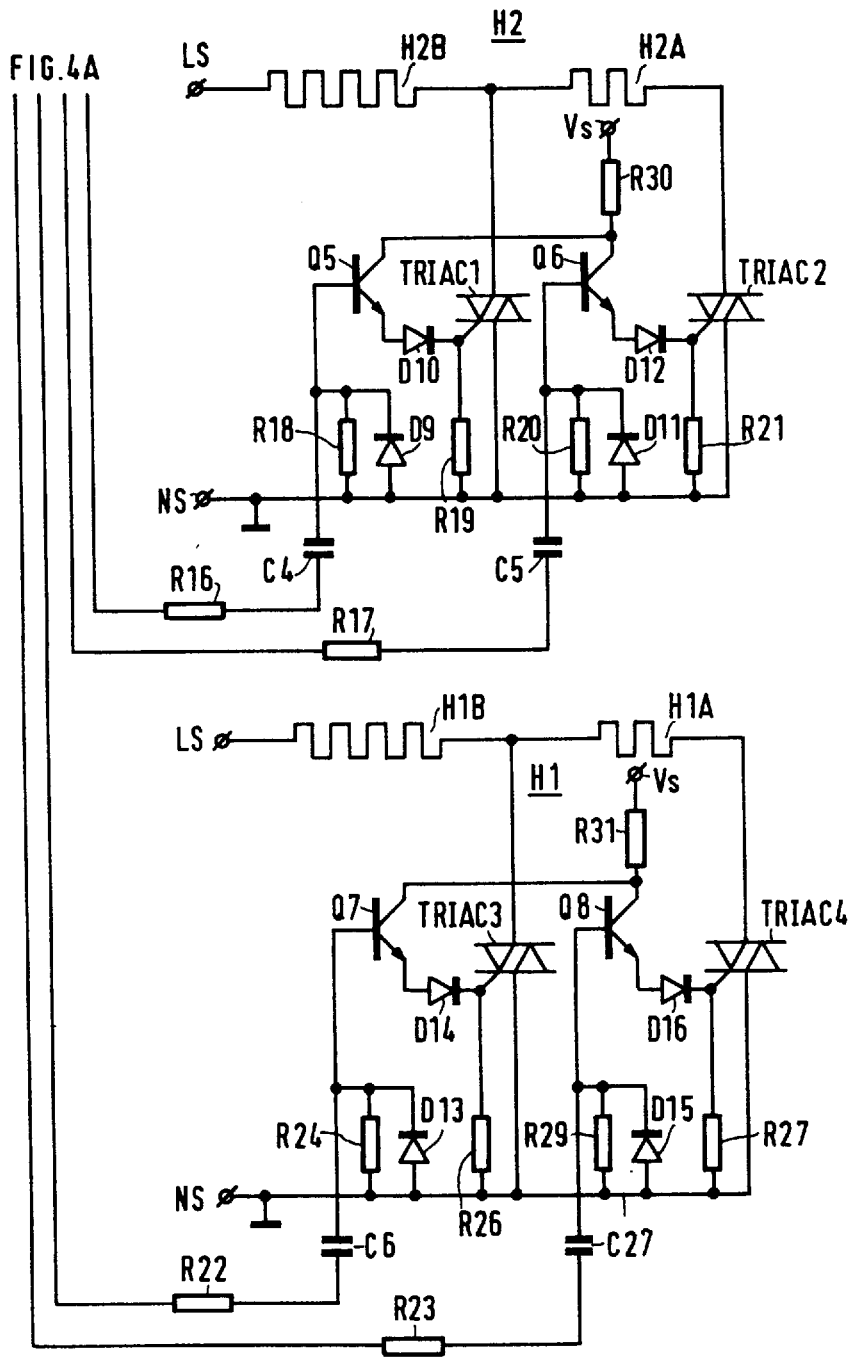

FIG. 4 shows an electrical circuit diagram of the toaster in FIGS. 1 and 2. When the control handle 12 is pushed down the contacts of a main switch SW5 are closed in the end position of the lift 6, as a result of which the mains voltage on the terminals L and N is transferred to the terminals LS and NS, the terminal NS being connected to signal ground. A transformer TR transforms the high mains voltage to a lower voltage, which is rectified by means of a rectifier bridge D1–D4, yielding a raw voltage Vb which energizes a solenoid SLD via a resistor R28. The raw voltage Vb is smoothed by a capacitor C8 via a diode D5, yielding a supply voltage Vs. The diode D5 prevents the capacitor C8 from being discharged through the solenoid SLD. The supply voltage Vs is further smoothed by a resistor R4 and a capacitor C9 and reduced to a supply voltage Vcc of, for example, 5 V. The voltage Vcc is connected to the emitter of a PNP transistor Q2, which has its collector connected to ground via a resistor R6 and which has its base connected to ground via a zener diode Z1. The zener diode Z1 receives a bias current derived from the supply voltage Vs via a resistor R5. The sum of the base-emitter voltage of the transistor Q2 and the zener voltage of the zener diode Z1 determines the magnitude of the supply voltage Vcc. When the mains voltage is turned on by means of the main switch SW5 the supply voltage Vs increases. The base of the transistor Q2 follows this increase until the zener voltage of the zener diode Z1 is reached. The supply voltage Vcc also increases but it increases more slowly than the supply voltage Vs owing to the resistor R4 and the capacitor C9. When a given value of the supply voltage Vcc is reached the transistor Q2 is turned on and the voltage across the resistor R6 increases rapidly from zero volts to approximately the supply voltage Vcc. The voltage variation across the resistor R6 is used to reset a microcontroller IC1. A diode D6 between the base and the emitter of the transistor Q2 protects the base-emitter junction of the transistor Q2 against excessive reverse voltages.

Upon receipt of the supply voltage Vcc and the reset pulse the microcontroller IC1 (type COP842CN) is put into operation, the clock frequency being determined by a resonator RES (for example a ceramic resonator at 5 MHz) with a parallel resistor R32. The microcontroller IC1 turns on a driver transistor Q4 via a resistor R12, which transistor is arranged in series with the solenoid SLD. As a result, the contacts of the main switch SW5 remain energized until the microcontroller IC1 turns off the driver transistor Q4, or until the solenoid SLD is short-circuited by means of a switch SW4 across the solenoid SLD, which switch is actuated by the user of the toaster.

The lower sub-element H2B has one terminal connected to the terminal LS. The other terminal is connected to the upper sub-element H2A. A first electronic switch TRIAC1 enables only the lower sub-element H2B to be connected to the terminal NS for receiving the mains voltage. A second electronic switch TRIAC2 enables the series arrangement of the lower sub-element H2B and the upper sub-element H2A to be connected to the terminal NS for receiving the mains voltage. Which of the two electronic switches TRIAC1 and TRIAC2 is activated depends on the size of the product to be toasted. In a similar way, the lower sub-element H1B is arranged in series with the upper sub-element H1A. A third electronic switch TRIAC3 enables only the lower sub-element H1B to be connected to the terminal NS for receiving the mains voltage, and a fourth electronic switch TRIAC4 enables the series arrangement of the lower sub-element H1B and the upper sub-element H1A to be connected to the terminal NS for receiving the mains voltage. Which of the two electronic switches TRIAC3 and TRIAC4 is activated again depends on the size of the product to be toasted.

The trigger electrode of the electronic switch TRIAC1 receives control pulses from the emitter of an NPN transistor Q5 via a diode D10, which transistor has its collector connected to the supply voltage Vs via a resistor R30. A resistor R19 between the trigger electrode of the electronic switch TRIAC1 and the terminal NS prevents triggering in the absence of control pulses. The diode D10 prevents the transistor Q5 from being turned on if the mains voltage on the terminal LS is negative relative to the terminal NS. The base of the transistor Q5 receives control pulses from the microcontroller IC1 via a series resistor R16 and a coupling capacitor C4. The base of the transistor Q5 is connected to the terminal NS via a resistor 18 in parallel with a diode D9. The cathode of the diode D9 is connected to the base of the transistor Q5, as a result of which the negative base-emitter voltage of the transistor Q5 cannot become smaller than one diode voltage. The coupling capacitor C4 prevents the electronic switch TRIAC1 from being fired in the event of malfunctioning of the microcontroller IC1.

The other three electronic switches TRIAC2, TRIAC3 and TRIAC4 are controlled by means of similar electronic control circuitry. The microcontroller IC1 turns the electronic switches on and off in accordance with a Multi Cycle Control pattern, in which the electronic switches are on or off during half-cycles of the mains voltage. For this purpose the microcontroller IC1 receives information from a zero cross circuit ZCC, which converts the sinusoidal mains voltage into a squarewave voltage of suitable amplitude and phase. The zero cross circuit ZCC comprises an NPN transistor Q1, which has its emitter connected to the terminal NS and which has its base connected to the terminal LS via three series-connected resistors R1, R47 and R2. The collector of the transistor Q1 is connected to the supply voltage Vcc by a resistor R3 and supplies a limited mains voltage to the microcontroller IC1. A capacitor C2 parallel to the resistor R2 ensures that the signal transients in the limited mains voltage are in phase with the zero crossings of the mains voltage. A diode D7 prevents an excessive reverse voltage across the base and the emitter of the transistor Q1.

In the case of series connection of the sub-elements the resistance increases and the power decreases. In order to allow for the power loss in the case of series connection the electronic switches TRIAC1 and TRIAC3 are turned on less long, averaged in time, than the electronic switches TRIAC2 and TRIAC4.

Instead of by means of triacs and Multi Cycle Control the sub-elements can also be activated by means of other electronic switches such as relays, or by means of mechanical switches in dependence upon the dimensions of the product to be toasted. The same applies to a division of the heating elements into more than two sub-elements.

The toasting time is adjusted by means of a timer circuit TMR, the microcontroller IC1 comparing the resistance value of a control potentiometer P1 and a series resistor R10 with that of a reference resistor R11 by charging a capacitor C3 and subsequently discharging it via the reference resistor R11 and via the potentiometer P1 and the resistor R10, and comparing the discharge times. The microcontroller IC1 further measures the temperature in the toaster by comparing the resistance of a resistor circuit including a temperature-dependent resistor NTC with the reference resistor R11. This enables the on-time to be corrected for a cold or warm toaster.

By means of the switches S1, S2 and S3 a number of program options can be selected, indicators LED1, LED2 and LED3 indicating which options have been selected. By means of the switch S1 one-side toasting can be chosen. In that case either the sub-elements H1A and H1B of the heating element H1 or the sub-elements H2A and H2B of the heating element H2 are active. By means of the second switch S2 it is possible to correct the toasting time for frozen bread, and by means of the third switch S3 the toasting time is limited to a fixed duration.

The IR photo-emitter 8 is an IR LED, which is turned on and off by the microcontroller IC1 via a driver transistor Q3 by means of a squarewave voltage on the base of the driver transistor Q3. The photo-receiver 9 receives the light from the photo-emitter 8 when the height of the product to be toasted is smaller than a given value. The received signal from the photo-receiver is amplified, filtered and limited by a circuit shown in FIG. 5 and is applied to the microcontroller IC1 as a signal HD. If the microcontroller IC1 receives a squarewave voltage only the lower sub-elements H1B and H2B are activated by means of the electronic switches TRIAC3 and TRIAC1, respectively, and if it does not receive a squarewave voltage the series arrangements of the lower and upper sub-elements H1B/H1A and H2B/H2A are activated by means of the electronic switches TRIAC 4 and TRIAC2, respectively.

Figure 5:
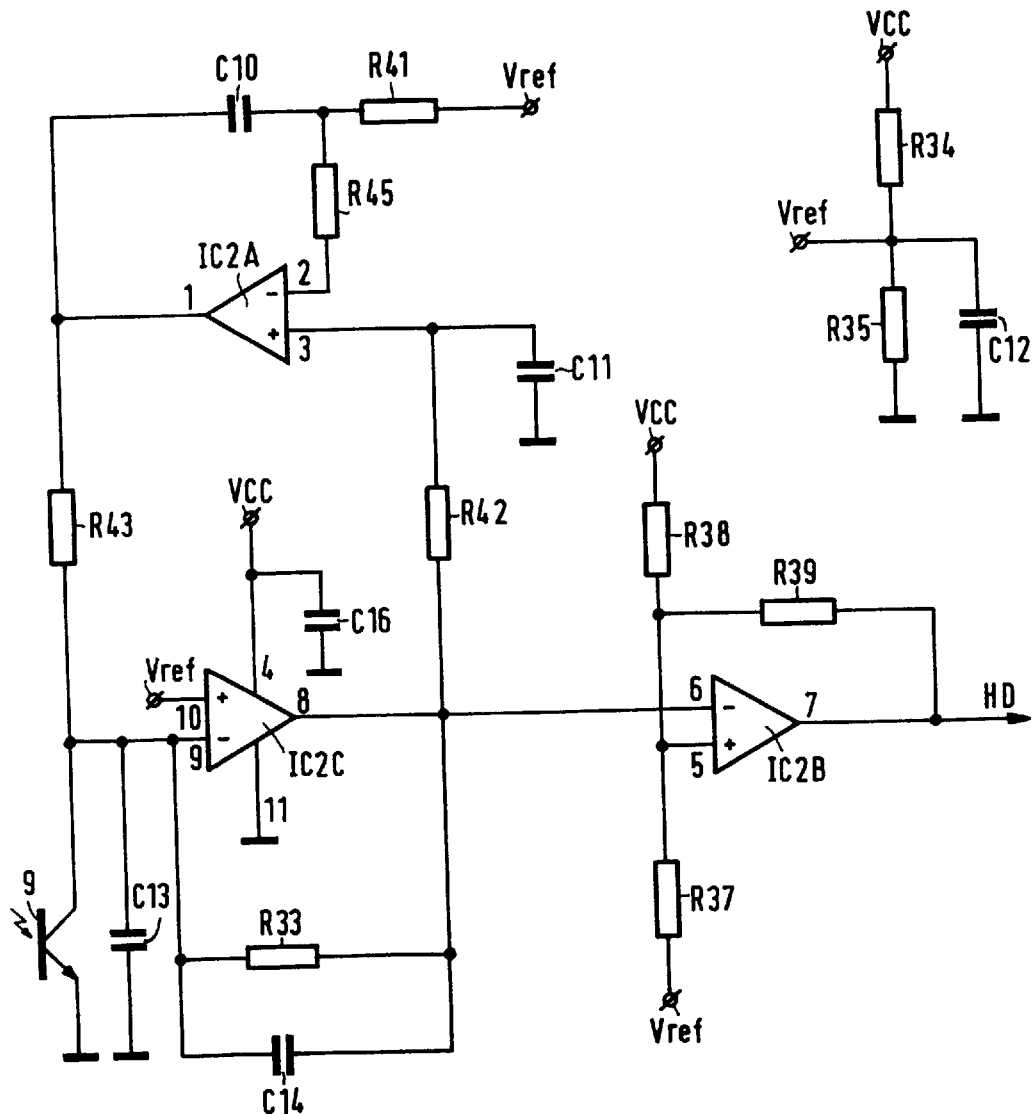
FIG. 5 is a diagram of an electric circuit for use in an embodiment of a toaster in accordance with the invention.

In the circuit shown in FIG. 5 the pulsating photo-current of the photo-receiver 9 is converted into a pulsating voltage by an amplifier IC2C and a feedback resistor R33, a comparator ICB2 comparing this voltage with a threshold voltage which is subject to hysteresis in order to suppress the effect of interference on the pulsating voltage. By means of a resistor R42, a capacitor C11, and integrating buffer amplifier IC2A and a resistor R43 the pulsating voltage is converted into a current which is fed back in phase opposition to the input of the amplifier IC2C, which results in a high rejection of undesired low frequencies in the photo-current of the photo-receiver 9.

Figure 3:
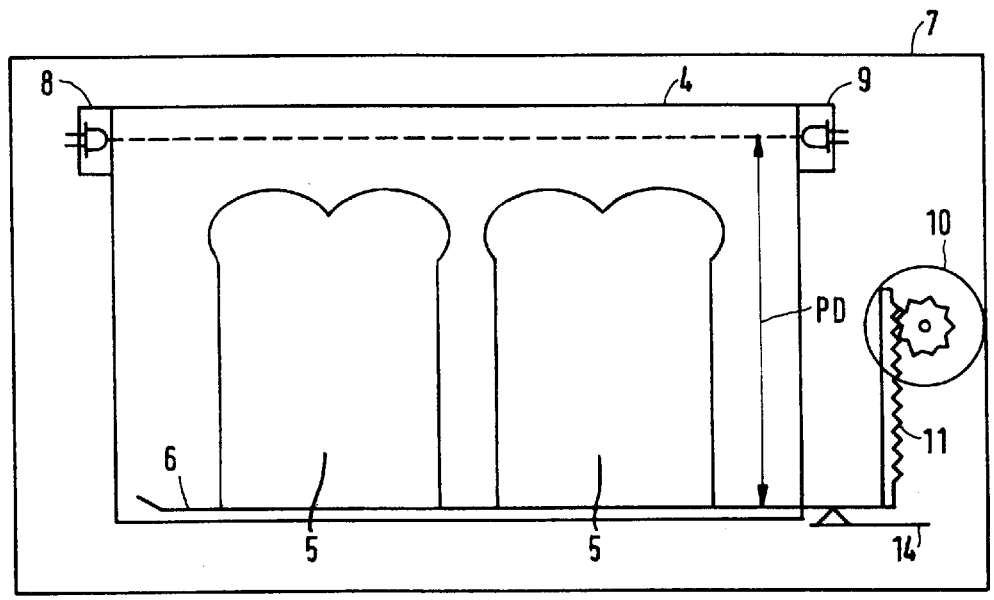
FIG. 3 is a longitudinal sectional view of an embodiment of a toaster in accordance with the invention.

For the embodiment with the motor lift as shown in FIG. 3 the circuit arrangement shown in FIG. 4 should be extended by a circuit for driving the motor 10. Moreover, the program of the microcontroller IC1 should include a routine for measuring the activation time during which the light beam is interrupted and, if desired, another routine for measuring the transport time which expires between the instant at which the interruption of the light beam begins and the instant at which the end position of the lift 6 is reached. The interruption of the light beam can also be utilized for automatically activating the motor lift. For this purpose it is alternatively possible to use a sensing device based on one or more mechanical sensors. When a slice of bread is inserted into the slot 3 the light beam is interrupted. This is signalled by the microcontroller IC1, which then puts the motor lift into operation. For this purpose, the electric circuits for the sensor, the signal processing of the sensor signal and the motor lift should be powered by voltages which are in standby when the toaster is connected to the mains voltage.

What is claimed is:

1. A toaster including a toasting chamber for receiving a product to be toasted, said toaster comprising:
   a. at least one heating element having first and second sub-elements, which can be separately activated, arranged in the toasting chamber for heating the product;
   b. detection means for determining a dimension of the product; and
   c. means for selectively activating the first and second sub-elements in dependence on the dimension determined.

2. A toaster as in claim 1 where the detection means comprises a sensor arranged in the toasting chamber for detecting the presence of the product to be toasted.

3. A toaster as in claim 2 where the sensor comprises an optical sensor device including a photo-emitter for emitting a light beam and a photo-receiver for receiving the light beam.

4. A toaster as in claim 2 where the sensor comprises a mechanical sensor.

5. A toaster as in claim 2 comprising:
   a. a motor lift for introducing the product into the toasting chamber;
   b. first time-measurement means for measuring an activation time of the sensor during the movement of the product past the sensor; and
   c. first calculating means for calculating the dimension of the product in response to the activation time and a transport speed of the motor lift.

6. A toaster as in claim 5 where the motor lift is adapted to move the product to an end position situated at a predetermined distance from the sensor, said toaster comprising:
   a. second time-measurement means for measuring a transport time which elapses between an instant when the activation of the sensor begins during movement of the product past said sensor and an instant when the end position is reached; and
   b. second calculating means for calculating the transport speed in response to the transport time and the predetermined distance.

7. A toaster as in claim 1 where the first and second sub-elements are constructed as a plurality of parallel strips which are positioned to face the product to be toasted.

8. A toaster as in claim 1 where:
   a. the at least one heating element comprises first and second heating elements, each having first and second sub-elements, said first and second heating elements being positioned to face opposite sides of the product to be heated; and b. the toaster includes means for selectively activating the first and second heating elements separately or together.

9. A toaster as in claim 1 where the first and second sub-elements are electrically connected to one another in a series arrangement, the first sub-element being connectable to a supply voltage by actuating a first electronic switch and the series arrangement being connectable to the supply voltage by actuating a second electronic switch.

10. A toaster as in claim 9 where the first and second electronic switches are actuated such that the average conduction time of the first electronic switch is smaller than the average conduction time of the second electronic switch.

11. A toaster as in claim 5 including means for activating the motor lift in response to a signal from the sensor.

* * * * *